Figure 1:
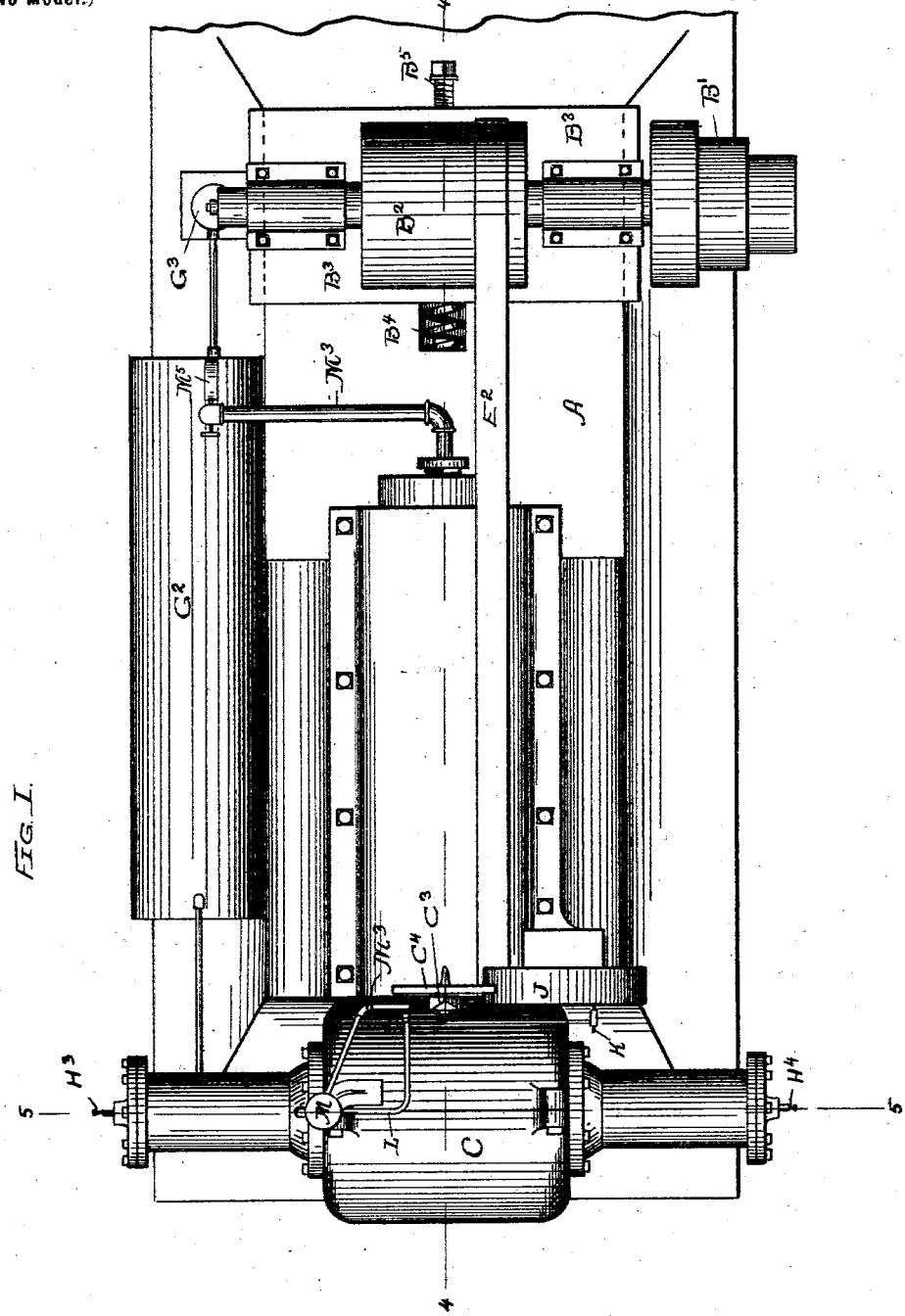

No. 634,007. Patented Oct. 3, 1899.
A. B. LAWTHER.
APPARATUS FOR MEASURING FRICTIONAL RESISTANCES BETWEEN BODIES IN SLIDING CONTACT.
(Application filed Mar. 14, 1898.)
(No Model.) 5 Sheets—Sheet 1.

FIG. I.

WITNESSES:

INVENTOR:
ALFRED B. LAWTHER.
BY Munday, Evarts & Adcock,
HIS ATTORNEYS

No. 634,007. Patented Oct. 3, 1899.
A. B. LAWTHER.
APPARATUS FOR MEASURING FRICTIONAL RESISTANCES BETWEEN BODIES IN SLIDING CONTACT.
(Application filed Mar. 14, 1898.)

(No Model.) 5 Sheets—Sheet 2.

WITNESSES:

INVENTOR:
ALFRED B. LAWTHER
HIS ATTORNEYS.

No. 634,007. Patented Oct. 3, 1899.
A. B. LAWTHER.
APPARATUS FOR MEASURING FRICTIONAL RESISTANCES BETWEEN BODIES IN SLIDING CONTACT.
(Application filed Mar. 14, 1898.)
(No Model.) 5 Sheets—Sheet 3.
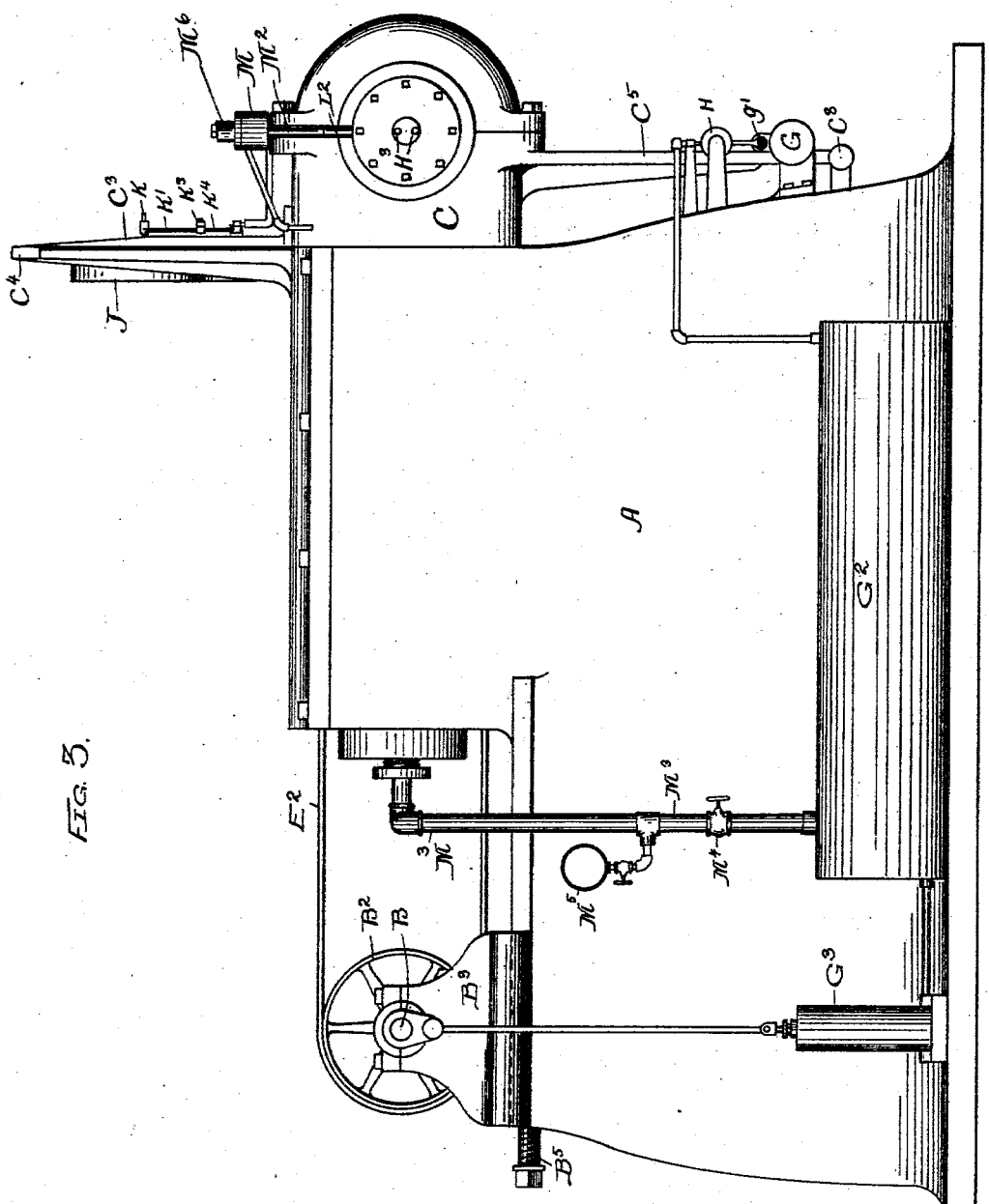
WITNESSES:
INVENTOR:
ALFRED B. LAWTHER
BY Munday, Evarts & Adcock
HIS ATTORNEYS.

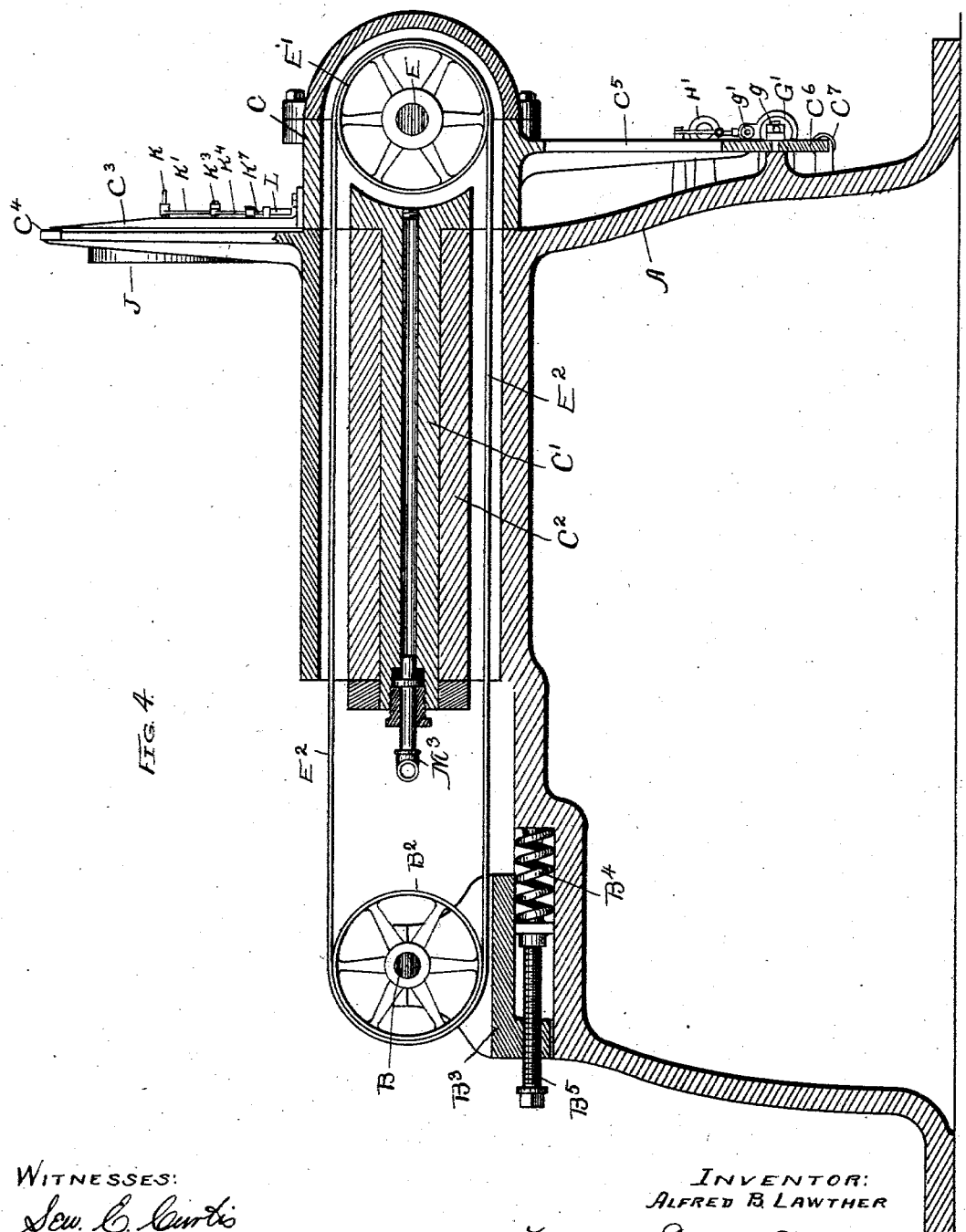

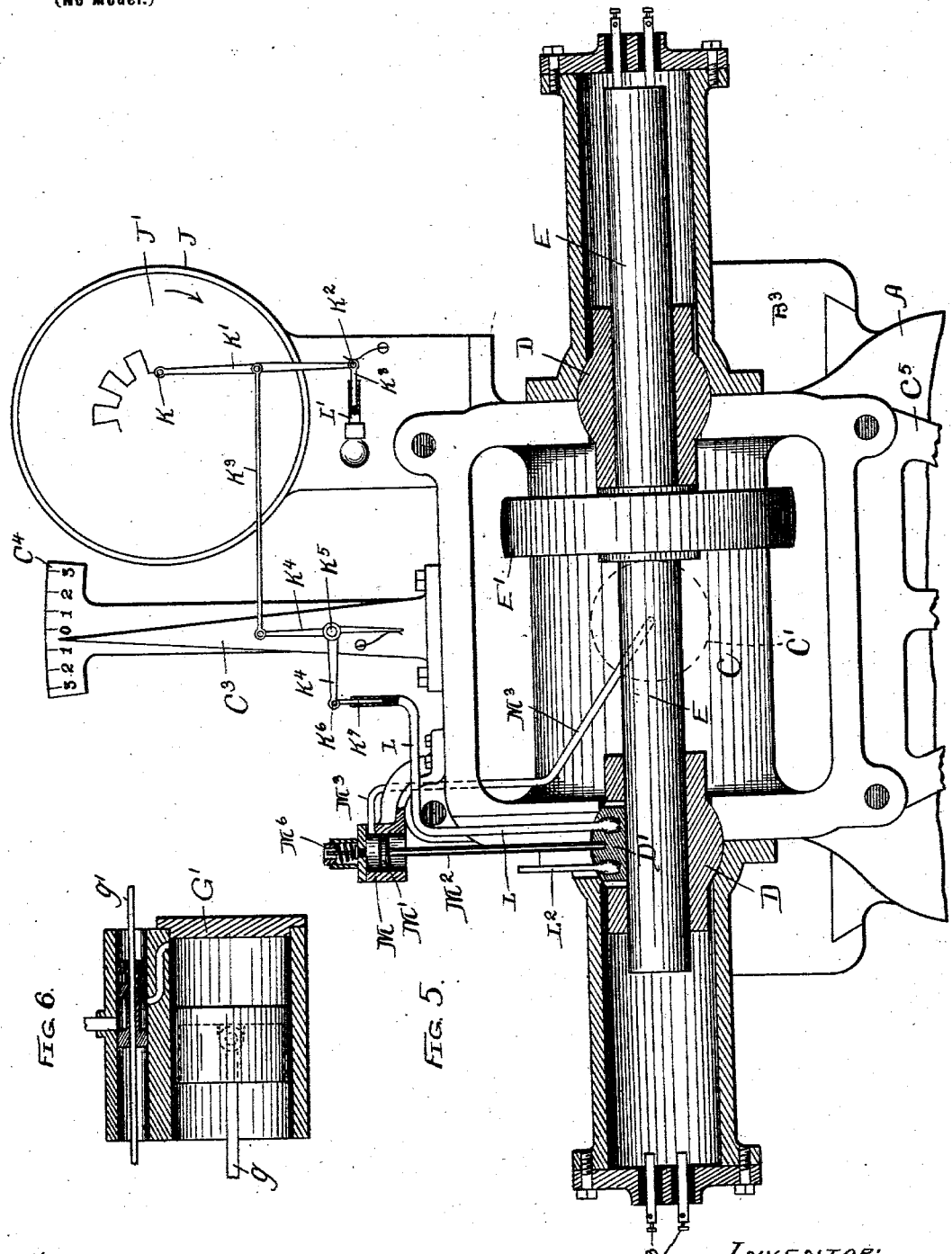

UNITED STATES PATENT OFFICE.

ALFRED B. LAWTHER, OF SYRACUSE, NEW YORK.

APPARATUS FOR MEASURING FRICTIONAL RESISTANCES BETWEEN BODIES IN SLIDING CONTACT.

SPECIFICATION forming part of Letters Patent No. 634,007, dated October 3, 1899.

Application filed March 14, 1898. Serial No. 673,799. (No model.)

*To all whom it may concern:*

Be it known that I, ALFRED B. LAWTHER, a citizen of the United States, residing in Syracuse, in the county of Onondaga and State of New York, have invented a new and useful Improvement in Apparatus for Measuring Frictional Resistances Between Bodies in Sliding Contact, of which the following is a specification.
This apparatus is designed for the purpose, among other things, of determining the value of lubricating substances, oils, &c., and of the various antifriction-bearings of all kinds.

The principle upon which the operation of the apparatus depends is, I believe, a newly-discovered one and never before applied to any machine. I have observed, and doubtless many thousands of people have observed the same thing, that when a machinist desires, for example, to force a tight-fitting pulley upon a shaft which he cannot slide on in a straight movement he resorts to the expedient of "wringing" it on, as it is termed— that is to say, he will secure the shaft firmly in a fixed position and then apply a portion of his force in the form of pressure tending to slide the pulley along the shaft and simultaneously another to rotate the pulley on the shaft, and by this helical movement he is able to get the pulley upon the shaft, which he could not do by a straight movement. My measuring apparatus is designed to operate upon a principle somewhat analogous to this workman's expedient; and it consists, essentially, in a revolving shaft mounted in a position inclined to the horizon. The degree of inclination is such that the weight of the shaft when the same is not revolving will be insufficient to cause the shaft to slide; but when the shaft is revolved the power causing the revolution operating simultaneously with the weight of the shaft will be sufficient to overcome the resistance of the bearings and the shaft will move slowly endwise through the bearings. Of course the same result will be produced if for the power of gravity a spring is substituted, in which case the shaft may of course be made perfectly horizontal and the amount of power applied in the endwise direction be regulated by the tension of the spring instead of the inclination of the shaft, and where throughout this description I speak of the "inclined" shaft or "inclinable" shaft it is to be understood that I mean a shaft having applied to it a force which tends to move it endwise, but which is not sufficiently great to so move it unless accompanied by a simultaneous rotation of the shaft; but it will be also understood that at the same time I prefer to employ the force of gravity in the endwise-operating power on the shaft, because I thereby avoid the production of friction in the application of this power.

It will be seen that such an apparatus as I have above indicated will serve by the rapidity of the endwise movement imparted to the shaft, the shaft being at the same inclination, to determine the relative amount of friction in any given set of bearings, the rotary movement of the shaft being a given or constant quantity, and in order that the operation of the apparatus may be continuous I only need to arrange and construct the apparatus in such manner that the endwise-operating force shall be applied first in one direction to thrust the shaft in that direction and then applied in the opposite direction alternately. This alternation gives a long-continued operation of the apparatus without the necessity of having a shaft of unwieldly length.

It may serve to make the principle of my apparatus clearer to state it in terms divested of mechanism and form, so far as such divestment may be readily conceived, as follows: Suppose a smooth metal plate with a plane surface be lying in a position nearly horizontal, but with a slight declination toward the west. Suppose that upon this plane surface there rests a metal block, the declination of the plane being so slight that the block will not by its own weight slide toward the west. Now suppose a power of some sort—say a string tied to the block—is applied to move the block toward the north. Then in that case as soon as the block is under motion its weight will cause it to travel not exactly north, but in a line a little west of north, in the diagonal of the parallelogram of forces, and the extent of this westward motion in any given length will be a measure of the force imparted to the block from which said force may be determined and from which as a corollary the relative frictional resistance of the sliding surfaces upon each other may be computed.

In the accompanying drawings, which form a part of this specification, and in which similar letters of reference indicate like parts throughout the several figures, I show an apparatus in which the endwise force applied to the shaft is the force of gravity due to a slight inclination of the shaft.

Figure 2:
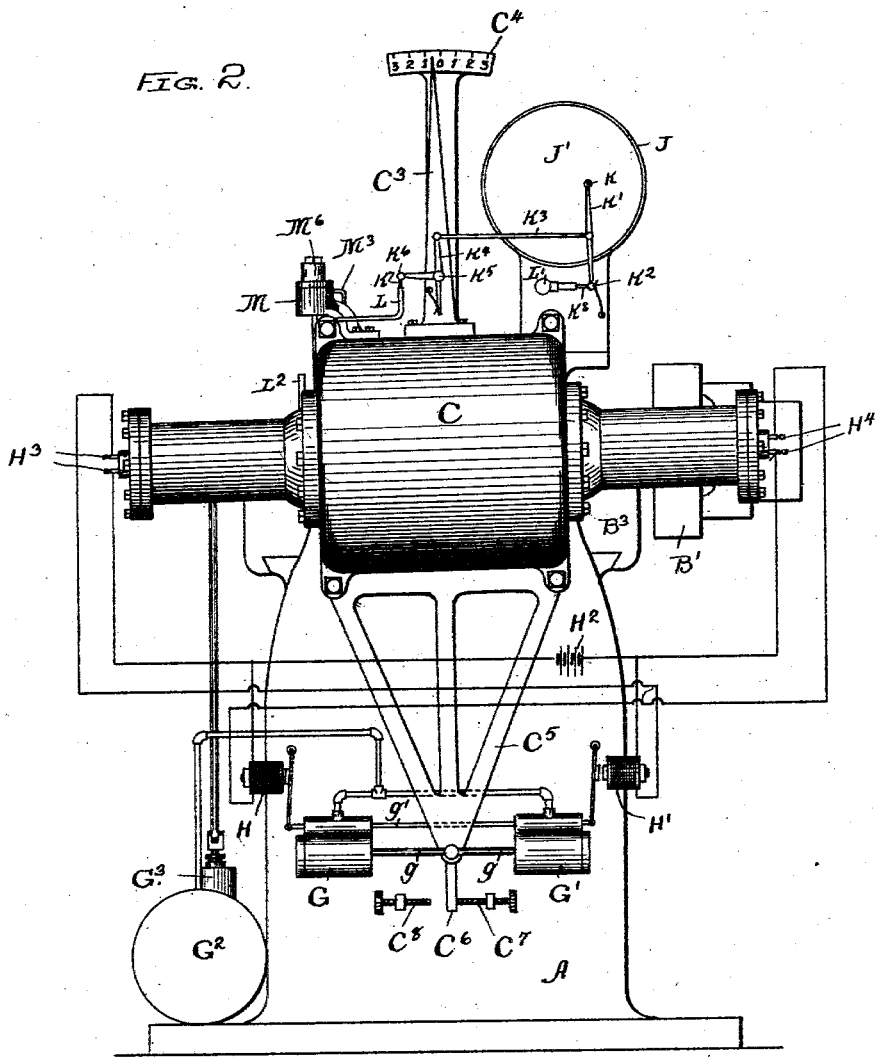

In said drawings, Figure 1 is a plan view of the apparatus. Fig. 2 is an end elevation showing that end of the machine which carries the inclined shaft. Fig. 3 is a side elevation. Fig. 4 is a vertical section on the line 4 4 of Fig. 1. Fig. 5 is a sectional view taken on the line 5 5 of Fig. 1, and Fig. 6 is a sectional view of one of the compressed-air cylinders for reversing the inclination of the shaft.

In said drawings, A is the stationary frame of the machine. Mounted on this frame at one end is the shaft B, carrying the driving-pulleys B' and a belt-pulley or drum $B^2$. This shaft and its appurtenances may be mounted on a movable bed $B^3$, which serves as a belt-tightener by reason of the spring $B^4$ and the tightening-screw $B^5$. At the other end of the machine is the oscillating carriage C, mounted on the long trunnion or shaft C' in the longitudinal bearing $C^2$. In this oscillating carriage are the bearings D, to be tested themselves or to contain the lubricating material which is to be tested, and mounted in these bearings D is the testing-shaft E, free to slide and also to rotate in said bearings D, and mounted on this testing-shaft is the band-pulley E', from which a band $E^2$ passes to the driving-drum $B^2$. Mounted on the upper portion of the oscillating frame C is a pointer-arm $C^3$, which indicates on the arc-plate $C^4$, fixed to the stationary framework of the machine, the arc of inclination of the testing-shaft E, and from the lower portion of the frame C extends an adjusting and operating arm $C^5$, the lower end of which $C^6$ moves between the two adjusting stop-screws $C^7$ $C^8$, fixed to the stationary frame of the machine and adjustable to limit in both directions the arc of oscillation of the said oscillating frame, and consequently the amount of inclination of the testing-shaft E in either of its two positions.

To avoid confusion from the other elements of the machine, we may stop to consider its operation in connection with the parts already described. Suppose power to be applied to the driving-shaft B and transmitted by the belt and pulley to the testing-shaft E at a given rate of revolution and suppose the testing-shaft to stand at the position and inclination shown in the drawings—that is to say, at such inclination that its own weight will not cause said shaft to slide endwise when not rotating. Then when said shaft begins to revolve it will also begin to slide slowly down its incline, and the speed of this descent will be the measure of the frictional resistance in the bearings, and this by proper devices may be recorded in a graphic report, as will be readily understood and as will be subsequently explained when we come to consider that part of the machine.

As a convenient, simple, and easily-operated means for changing the inclination of the testing-shaft by tipping the oscillating frame C in one direction and then in the other alternately at each descent of the testing-shaft I provide two cylinders. G G', each provided with a piston $g$, connected to the oscillating frame, and each having a valve and valve-stem $g'$. These cylinders are connected to a compressed-air reservoir $G^2$ by suitable piping, and an air-pump $G^3$ may be provided to keep within said reservoir a supply of compressed air. The valves of the two cylinders are operated by magnets H H', connected in circuit with a battery $H^2$ and two pairs of contact-points $H^3$ $H^4$, one pair at each end of the oscillating frame in position so that when the end of the test-shaft E reaches its lowest point it will touch the two contact-points and close the circuit through one or other of the magnets H H', which will attract its armature, attached to the valve-stem, and reverse the positions of the valves in the two cylinders G G', causing the pistons and piston-rods to reverse their position and swing the oscillating frame, thus reversing the inclination of the testing-shaft at the instant it has reached the lowest point in its fall. Other well-known mechanism may be employed for this purpose, as will be apparent to those skilled in the arts, the only requirement being that the mechanism for reversing the position of the shaft should be brought into operation at the indeterminate time when the shaft has reached its lowest position in both directions alternately.

To produce and present a graphic record of the operation of the machine, I introduce a clock or time mechanism, which carries a sheet of paper in a circular path at a stated rate of movement—say one revolution per hour. The case for the time mechanism is indicated at J, and the paper record-sheet at J'. I have not shown a construction of clock itself, as this will be readily understood by anybody without illustration. At K is a pen or pencil point bearing on the paper of the dial and carried on the lever K', the lower end of which is pivoted at $K^2$. A rod $K^3$ connects the lever K' with the bell-crank lever $K^4$, pivoted at $K^5$ to the pointer-arm $C^3$. The other end of the bell-crank lever $K^4$ is pivoted at $K^6$ to a stem $K^7$, entering a thermometer-tube L, and the pivot $K^2$ of the lever K' is likewise upon a similar stem $K^8$ of the thermometer-tube L'. The bulb of the thermometer L is located in a movable part D' of one of the bearings D for the tester-shaft, while the bulb of the thermometer L' is located in the open air.

The operation of the recording apparatus is as follows: The pencil K, because of the rotation of the paper record-sheet J', traces a circular line upon said sheet until the moment when the inclination of the testing-shaft is reversed by the swinging of the oscillating frame, at which time the pointer $C^3$, moving with said oscillating frame, carries the lever $K^4$ bodily over either toward or away from the recording apparatus, causing said pencil K to trace a line of a radial character, and then the continuation of the circular movement of the sheet begins again and continues until the next oscillation, when another radial line is traced in the opposite direction, and so on as long as the machine is running. The resulting figure traced upon the sheet will roughly resemble the teeth of the gear-wheel, each tooth indicating a reversal of the inclination of the testing-shaft, and this affords a means for counting the number of reversals which have taken place in a given time. The time—hours, minutes, and seconds—may be printed or marked upon the record-sheet in equal-spaced radial lines, which to avoid confusion are not shown in the drawings.

In order that a simultaneous record of the temperature of the bearings under examination may be kept, the two thermometers L L' above mentioned are provided. The thermometer L, with its bulb located in the bearing itself, denotes its temperature, and this is conveyed to the record-sheet by the movement of the stem $K^7$, any rise in temperature lifting said stem and moving the bell-crank lever $K^4$, the result of which is to throw the pencil K out toward the periphery of the record-sheet. To get at the actual temperature, however, of the bearing, I provide for subtracting from this motion the atmospheric temperature. This is done by the thermometer L', whose bulb is located in the open air. Its stem $K^8$, being connected to the pivot $K^2$, positions the pencil K to a point representing the difference between the atmospheric temperature and the temperature of the bearing D, for any rise in the atmospheric temperature by pushing out the stem $K^8$ will tend in proportion to throw the pencil K in toward the center of the record-sheet, and the record-sheet J' may be provided with concentric lines printed or marked thereon to indicate the temperature, which will be read by noting between which of the concentric lines (not shown in the drawings) the circular marks of the pencil K occur, and thus any fall or rise of the temperature during the operation of the machine is duly recorded. For convenience of seeing at any time and without reference to the recording apparatus above described the actual temperature of the bearing I prefer to provide a third thermometer $L^2$, which may be read in the ordinary way by the position of the mercury in its tube.

To provide for a predetermined and adjustable pressure on the testing-shaft in its bearings, which is also or may be a factor in making tests of bearing and lubricating material, I make a part D' of one or both of the bearings D movable and apply a pressure device thereto for pressing this movable part of the bearing against the shaft. This pressure device may consist of a spring with a screw tension device for increasing its tension in a regulable way or other suitable mechanism; but I prefer to employ air-pressure for this purpose, and I have shown such a device in the drawings. M is a cylinder containing a piston M', the piston-rod $M^2$ of which sets into the movable bearing part D'. A pipe $M^3$ is carried to the trunnion-shaft C' and through the center of this shaft to the air-reservoir $G^2$, so that a stated pressure is brought to bear upon said bearing-plate D'. In order that this pressure may be regulated to any desired amount, I provide an ordinary pressure-regulating valve $M^4$ on the pipe $M^3$, and that the amount of pressure employed may be indicated a pressure-gage $M^5$ (see Fig. 3) is provided, and as a further guarantee that the required pressure shall never be exceeded a regulable safety-valve $M^6$ may be applied to the pressure-cylinder M.

The machine shown in the drawings is specially designed for testing lubricating-oils, fats, and such like materials. Where it is desired to test the frictional qualities of different metals in bearings, it would be desirable to have some readier means for removing the bearings D and replacing them rapidly than is shown in the machine indicated; but it is not necessary here to describe such incidental changes in construction, because any mechanic will know how this may be done.

I claim—

1. The means for measuring frictional resistance between bodies in sliding contact, which consists in a revoluble shaft mounted in bearings and free to slide endwise in said bearings, and having a force applied to revolve the shaft and another force applied to slide the shaft endwise, the latter force being insufficient to slide the shaft except when said shaft is revolving, the shaft being free to slide in either direction and the force to slide the same being applied alternately in opposite directions, combined with means for recording on a time-sheet said alternations, and also with means for simultaneously recording on the same sheet the temperature of the bearings of said shaft, substantially as specified.

2. The improvement in the art of measuring the frictional resistance of sliding surfaces of bodies, which consists in sliding one of the surfaces upon the other by the application to the movable body of two unequal forces at an angle to each other, one of said forces being insufficient to move the body when at rest, and the other being greater, the measure of frictional resistance being determined by the extent of the influence of the lesser force upon the movement, substantially as specified.

3. The means for measuring frictional resistance between bodies in sliding contact, which consists in a revoluble shaft mounted in bearings and free to slide endwise in said bearings, and having a force applied to revolve the shaft and another force applied to slide the shaft endwise, the latter force being insufficient to slide the shaft except when said shaft is revolving, the latter force being the attraction of gravitation utilized by giving the shaft an inclination from the horizon, substantially as specified.

4. The means for measuring frictional resistance between bodies in sliding contact, which consists in a revoluble shaft mounted in bearings and free to slide endwise in said bearings, and having a force applied to revolve the shaft and another force applied to slide the shaft endwise, the latter force being insufficient to slide the shaft except when said shaft is revolving, the latter force being the attraction of gravitation induced by giving the shaft an inclination from the horizon, the shaft being free to slide in either direction, and means for alternately applying the attraction of gravitation to slide the shaft in opposite directions, consisting of means for reversing the inclination of the shaft, substantially as specified.

5. The means for measuring frictional resistance between bodies in sliding contact, which consists in a revoluble shaft mounted in bearings, said bearings being mounted in an oscillating frame to give the shaft inclination to the horizon alternately in opposite directions, and means for automatically oscillating said frame, said means being governed and controlled by the endwise movement of the shaft, substantially as specified.

6. The means for measuring frictional resistance between bodies in sliding contact, which consists in a revoluble shaft mounted in bearings and free to slide endwise in said bearings, said bearings being mounted in an oscillating frame, to give the shaft inclination to the horizon alternately in opposite directions, and means for automatically oscillating said frame, said means being governed and controlled by the endwise movement of the shaft closing an electric circuit, substantially as specified.

7. The means for measuring frictional resistance between bodies in sliding contact, which consists in a revoluble shaft mounted in bearings and free to slide endwise in said bearings, said bearings being mounted in an oscillating frame to give the shaft inclination to the horizon alternately in opposite directions, and means for automatically oscillating said frame, said means being governed and controlled by the endwise movement of the shaft, the means for oscillating said frame consisting of a pair of oppositely-operating engine-cylinders and their pistons, substantially as specified.

8. The combination with the revoluble shaft free to slide endwise, and having means for inclining the same in opposite directions, of means for increasing the pressure between the said shaft and its bearing, which consists in making a portion of the bearing movable and connecting therewith a device for producing regulable pressure thereon, said device consisting of a compressed-air cylinder, substantially as specified.

ALFRED B. LAWTHER.

Witnesses:
H. M. MUNDAY,
D. BARSTOW.